Sept. 17, 1929. J. C. MORRISON 1,728,436
TRUCK
Filed Sept. 27, 1927 2 Sheets-Sheet 1

Inventor
Joseph C. Morrison
By
Attorney

Sept. 17, 1929.  J. C. MORRISON  1,728,436
TRUCK
Filed Sept. 27, 1927   2 Sheets-Sheet 2

Inventor
Joseph C. Morrison
By
Attorneys

Patented Sept. 17, 1929

1,728,436

UNITED STATES PATENT OFFICE

JOSEPH C. MORRISON, OF CINCINNATI, OHIO, ASSIGNOR TO THE HAMILTON CASTER & MANUFACTURING COMPANY, OF HAMILTON, OHIO, A CORPORATION OF OHIO

TRUCK

Application filed September 27, 1927. Serial No. 222,344.

This invention relates to trucks and is particularly directed to an improved truck frame corner construction and gate or stake mounting means.

The type of truck herein involved consists generally of a metal fabricated chassis and either a wooden or metal plate platform therefor. The truck platform frame is formed of T-iron, channel iron, etc. and has heretofore been constructed by bending lengths of iron at right angles through the use of forming dies and joining the ends to form a rectangular skeleton frame for the truck platform. This corner bending has been a difficult and tedious operation, necessitating a bending form or die for each size truck.

It is an object of this invention to provide an improved truck frame corner construction.

Another object is to provide an improved metal truck frame construction wherein the truck dimensions may be easily varied and any area of platform surface provided without the use of special size forming dies.

Another object is to provide rounded corner members joining side rails and end rails and at the same time providing sockets for supporting end gates or stakes at the corners of the truck, and permitting the use of a substantially full truck width gate.

It is still another object to provide truck corner members slotted and recessed to receive the respective ends of flanged side rails for rigidly securing and binding the entire frame together and providing a continuously flush outer frame surface and an even platform supporting surface.

Further objects and advantages will be more fully set forth in the description of the accompanying drawings forming a part of this specification, in which.

Figure 1:
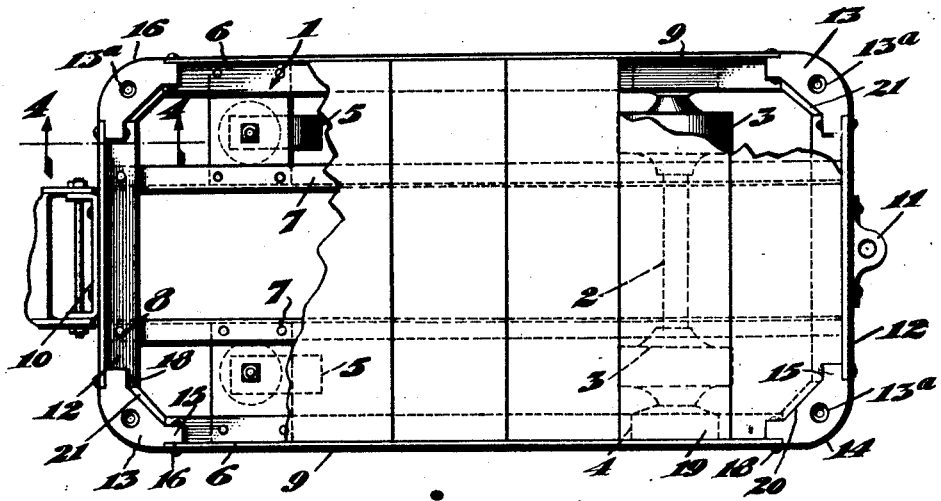
Figure 1 is a plan view of a trailer truck showing the improvement incorporated in the T-iron formed frame thereof, certain portions of the platform being broken away to more fully illustrate the construction of the frame.
Figure 2:
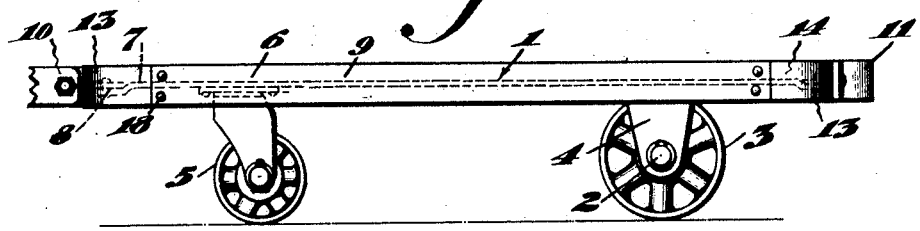
Figure 2 is a side elevation of Figure 1.

Referring to Figures 1, 2, 3 and 4 of the drawings, the truck frame is indicated generally at 1. The truck shown here is of the trailer type having a rear axle 2 carrying the wheels 3 and mounted in brackets 4 secured to the underside of the truck frame 1. The forward end of the truck is provided with a pair of swivelling casters 5 for allowing proper steering movement of the trailer.

The truck frame as shown in these views is formed of T-iron, the T-iron being disposed with the horizontal flange toward the inside of the truck, thereby presenting the unbroken surface of the vertical flange 6 toward the outside. A pair of longitudinally extending angle iron rails 7 are riveted to the underside of the inwardly extending flange of the T-iron at the ends of the truck frame as indicated at 8. The swivelling casters are each secured at their respective sides of the truck to the underside of the horizontally extending flange of a side T-iron rail 9 and to the horizontally extending flange of a longitudinally extending angle iron rail 7.

The truck is further provided with a draft means 10 at the forward end and a bracket 11 at the rear end thereof to which may be attached the next trailer of a string.

Figure 3:
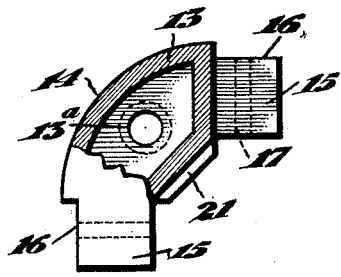
Figure 3 is a detailed view of one of the corner members removed from the assembly and shown partly in section to more fully illustrate the same.
Figure 4:
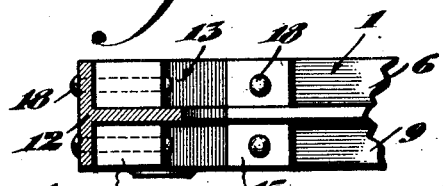
Figure 4 is a sectional view taken on line 4—4, Figure 1, further detailing the corner construction.
Figure 5:
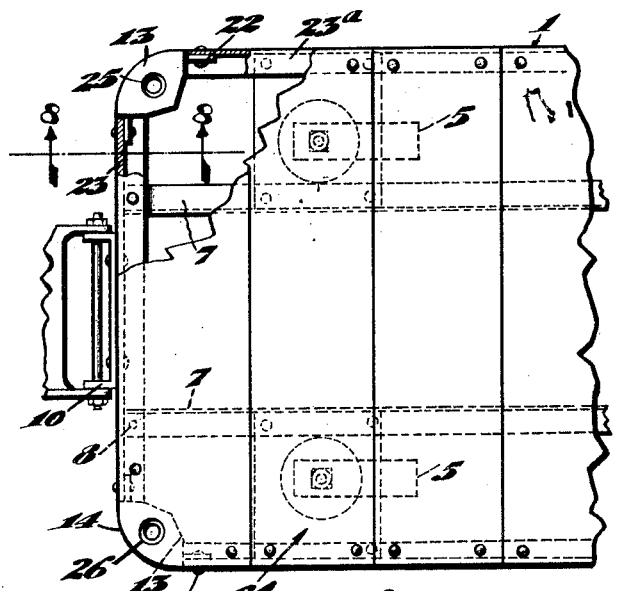
Figure 5 is a fragmentary plan view somewhat similar to Figure 1 but showing the frame constructed of channel iron.
Figure 6:
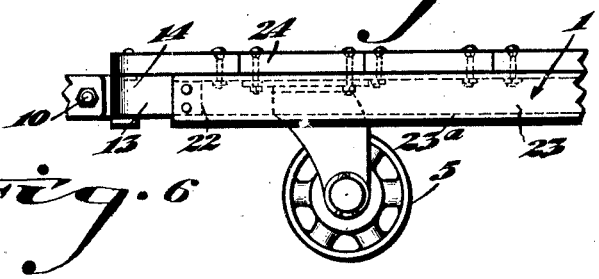
Figure 6 is a side elevation of Figure 5.
Figure 7:
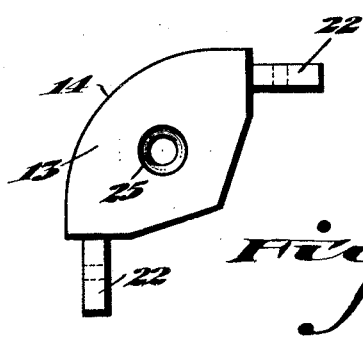
Figure 7 is a plan view of the channel iron type of corner member, showing it removed from the assembly shown in Figure 5.
Figure 8:
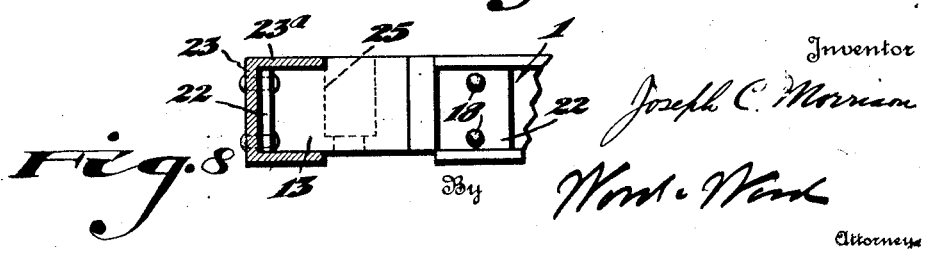
Figure 8 is a sectional view taken on line 8—8, Figure 5, showing the corner construction of the channel iron type of frame.

The frame 1 is made up of the side rails 9 and end rails 12 secured together at the corners by means of corner members 13. The corner members 13 are hollow as illustrated in Figure 3 and are apertured so as to be used as stake sockets or sockets for end gates (not shown).

The outer surfaces of the corner members are rounded as at 14 to provide the necessary corner finish to the trailer and are provided with pairs of attaching lugs 15 extending out from the respective ends of the corner members at right angles to each other. The respective pairs of lugs are horizontally spaced apart forming a slot to receive the horizontally extending flange of the T-irons and have their outer faces 16 set back from the rounded faces 14 the thickness of the vertical T-iron flange. The lugs are further provided with bores 17 receiving the rivets 18 securing the T-irons in place in the corner members.

The recessing of the lugs and the provision of the slot therebetween enables the end of the T-irons to be rigidly secured and to be mounted flush with the outer curving surface 12 of the corner members.

As shown in Figure 1, the platform planking 19 is mounted on the horizontal flanges of the T-irons and is thus set within the frame 1. The end planks are suitably notched out to fit evenly around the lugs and the body of the corner members as shown at 20. A horizontal ledge 21 extends inwardly from a point intermediate of the inner face of the corner members, this ledge being in the same plane with the horizontal flanges of the T-irons and thus aiding in the support of the planking at this point. A vertically disposed aperture 13$^a$ is provided in each corner member substantially in the center thereof and serves to receive the ends of stakes or gates. The location of the sockets permits the use of a gate substantially the width of the truck and a rigid mounting for the gate is provided.

Referring to Figures 5, 6, 7 and 8 of the drawings, a modified form of truck frame is shown. In this form channel iron is used and a single lug 22 is provided at each end of the corner members 13 substantially in the same relation as the pairs shown in the first described form. The outer face of the vertical flange 23 of the channel irons is also flush with the outer face of the corner members due to a slight recessing of the lugs 22.

The upper horizontal flanges 23$^a$ of the channel iron side rails are flush with the top surface of the corner members, the lugs 22 being recessed from the top as well as from the side of the corner members. This flush upper surface is provided so that the planking 24 or a metal plate if desired may be secured to the top surface of the truck frame.

Vertical apertures 25 are provided in the corner brackets and the planking is provided with apertures 26 in alignment with the apertures in the corner members. The remainder of the modified construction is identical with that of the first form so that no further description thereof need be made.

Having described my invention, I claim:

1. A truck platform frame, comprising, side rails, end rails, said rails having vertical and horizontal flanges, corner members joining said rails to form a rectangular frame, the horizontal and vertical flanges of said rails having their attached ends recessed within the corner members providing a continuous flush outer frame surface, and platform supporting ledges formed on said corner members in the same plane with the horizontal rail flanges forming therewith a flush platform support surface.

2. A truck platform construction, comprising, T-iron side rails and end rails, corner socket elements having slotted ends for receiving the respective horizontal web flanges of the T-iron rail, means for securing the rails and corner elements together, and inwardly disposed supporting ledges formed on the corner elements and extending between the slots and in the same plane therewith.

In witness whereof, I hereunto subscribe my name.

JOSEPH C. MORRISON.